F. G. KEYES.
APPARATUS FOR CATALYZING THE SYNTHESIS OF ORGANIC SUBSTITUTION PRODUCTS.
APPLICATION FILED JULY 25, 1913.

1,198,356.

Patented Sept. 12, 1916.
2 SHEETS—SHEET 1.

Witnesses:
Chas. F. Clagett
Thos. D. Brown

Frederick G. Keyes
Inventor

By his Attorney
George H. Stockbridge

F. G. KEYES.
APPARATUS FOR CATALYZING THE SYNTHESIS OF ORGANIC SUBSTITUTION PRODUCTS.
APPLICATION FILED JULY 25, 1913.

1,198,356.
Patented Sept. 12, 1916.
2 SHEETS—SHEET 2.

UNITED STATES PATENT OFFICE.

FREDERICK G. KEYES, OF BOSTON, MASSACHUSETTS, ASSIGNOR TO COOPER HEWITT ELECTRIC COMPANY, OF HOBOKEN, NEW JERSEY, A CORPORATION OF NEW JERSEY.

APPARATUS FOR CATALYZING THE SYNTHESIS OF ORGANIC SUBSTITUTION PRODUCTS.

1,198,356.

Specification of Letters Patent.  Patented Sept. 12, 1916.

Application filed July 25, 1913. Serial No. 781,049.

*To all whom it may concern:*

Be it known that I, FREDERICK G. KEYES, a citizen of the United States, and resident of Boston, county of Suffolk, State of Massachusetts, have invented certain new and useful Improvements in Apparatus for Catalyzing the Synthesis of Organic Substitution Products, of which the following is a specification.

My invention relates to methods of forming organic compounds and more particularly to a convenient method of catalyzing or stimulating certain reactions which take place sluggishly or not at all under the conditions of ordinary manipulation. In carrying out my process I may rely upon certain energizing means such as electrically excited quartz tubes containing mercury vapor or some suitable gas for producing the radiation by electric means.

I have illustrated one application of the invention in connection with certain derivatives of benzene or compounds of benzene which has the formula $C_6H_6$. For one or more of the hydrogen atoms of the benzene I may substitute $CH_3$ and may replace (by my process) two of the latter atoms of hydrogen with bromid. For example to produce dibrom-xylene I may mix bromin with the benzene derivative and expose the mixture to the effect of the radiation from the quartz mercury vapor tube which catalyzes the reaction with a copious evolution of gaseous hydrogen bromid the dibrom compound remaining behind. This process proceeds ordinarily only in sun-light and then very slowly, but with my use of the radiation from a quartz lamp, catalyzing takes place with tremendously greater rapidity and certainty. The particular materials here chosen are merely illustrative of my general method, and my invention is broad enough to cover the application of catalyzing radiations to chemical synthesis in connection with a mercury vapor apparatus; neither is the quartz a necessity in producing these results, though quartz is often advantageous. I have found certain forms of apparatus useful in carrying out these processes and will describe them in connection with the accompanying drawings in which—

Figure 1:
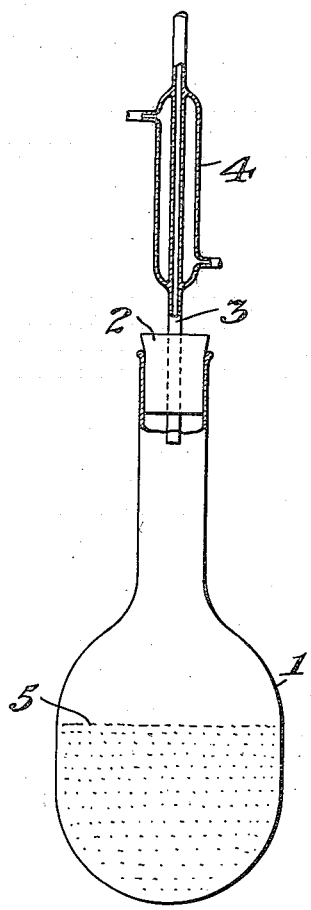
Figure 2:
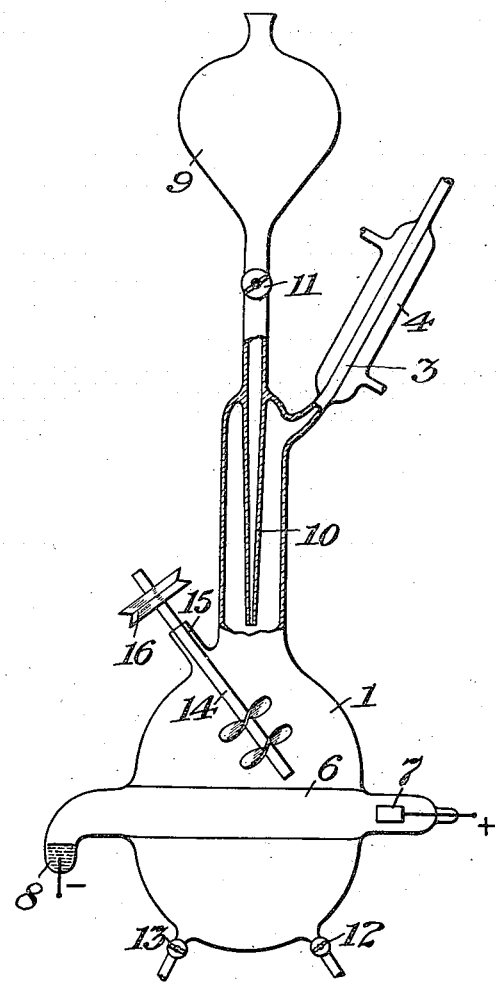

Figure 1 shows a simple flask arranged to be operated upon; Fig. 2 shows a more elaborate and efficient apparatus and Fig. 3 an apparatus adapted for continuous operation.

In the first figure, 1 is a flask of quartz containing the mixture to be acted upon; 2 is a cork or closing plug; 3 is a vent tube and 4 a condenser which condenses vapors arising from the materials within the flask and permits them to return to the flask as liquid through the action of gravity. The materials to be acted upon, 5, are assembled in the flask which is exposed to the influence of a mercury vapor quartz tube of the well known type. As quartz is transparent to the radiations from this source, it will transmit its influence within the flask and permit the procedure of the reaction.

In Fig. 2 I show at 1 an enlarged quartz vessel, having formed integral therewith a mercury vapor tube, 6, also having walls of quartz and supplied with electrodes 7 and 8 outside the flask 1. I provide a vent, 3, a condenser, 4, as in Fig. 1, but also furnish a reservoir, 9, for one of the ingredients, say bromin, which is fed into the flask, 1, through the passage, 10, and which is controlled by the cock, 11. I also provide inlets and outlets, 12 and 13, at the bottom of the flask for other ingredients. It is desirable that the material be thoroughly mixed to secure complete and uniform reaction and to bring all of the material under the influence of the radiation, so I furnish a stirring rod or paddle, 14, carried out through a stuffing box, 15, in the wall of the flask, 1, and provided with a pulley or other driving mechanism at 16. When, now, current is passed through the mercury vapor device, 6, the catalyzing radiations are produced and the charge, for example, of toluene and halogen begins to react as already explained. When this charge has been acted upon it may be removed and a fresh charge treated, the paddle, 14, being kept in motion as desired during this process. Any vapors which may appear will seek the vent, 3, and there will be condensed on the walls of the vent which are cooled by the condenser, 4, and will trickle back into the main body of the flask.

Figure 3:
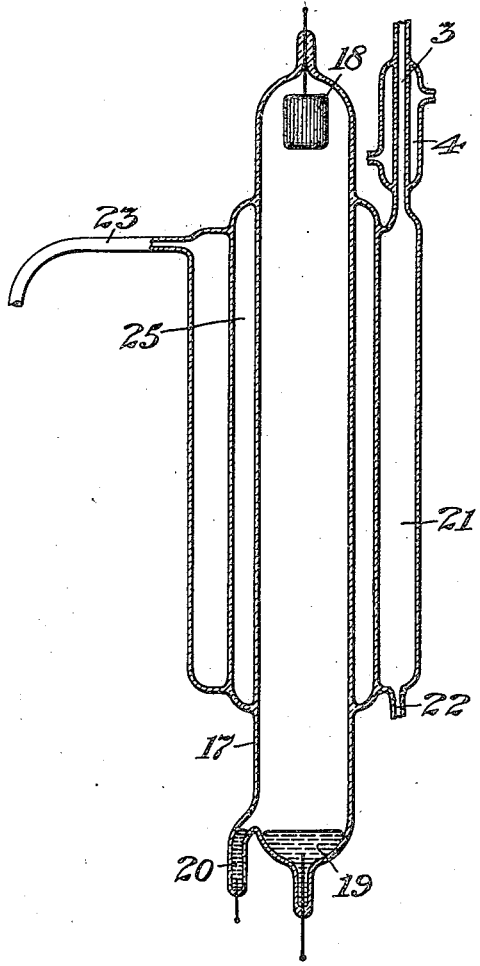

In Fig. 3, 17 is the tubular portion of the mercury vapor apparatus having a quartz container, an anode 18, a mercury cathode, 19, and a starting anode 20. I surround this vapor apparatus with a jacket, 21, having an inlet, 22, and an outlet, 23, and a vent, 3, and a condenser, 4, therefor. I may also, when desired, surround the tube, 17, with a jacket, 25, which jacket may be exhausted, if desired. All the parts so far described, except the electrodes, may be made of quartz.

This apparatus is adapted to continuous operation. The ingredients to be acted upon, suitably mixed, as for example, a halogen mixed with a hydrocarbon, are fed in at the inlet, 22, and pass at a suitable velocity up and around the tube, 17, being acted upon as they pass by the radiations produced by the current and finally are delivered to the outlet, 23, with the chemical reaction complete. With the vacuum jacket around the tube, 17, the liquids passing through the jacket, 21, are protected from the heat produced during the operation of the current between the electrodes, 18 and 19. The condenser, 4, and the vent, 3, act as in the systems shown in the other drawings.

I wish it understood that my invention is not limited to the use of quartz for the container of the vapor electric apparatus, nor for the apparatus containing the liquid to be operated upon, but any material transparent to the particular emanations or radiations relied upon may be substituted therefor. Neither do I limit myself to a mercury vapor apparatus as a source of catalyzing radiation for I may use other forms of electric discharges or any other source of suitable radiations such as may serve in any particular case. My method may be used where a hydro-carbon is to be acted upon by an element or a mixture of elements, especially the halogens for its applicability is very general. Neither do I wish to limit myself to liquids for gaseous materials and even solids may be acted upon by the same means and, where similar results are obtained by equivalent means, they fall within the scope of my invention.

I claim as my invention:

1. An apparatus for use in catalyzing comprising an enlarged quartz vessel having a mercury vapor tube formed integral therewith and having walls of quartz and suitable electrodes, a vent tube and a condenser in combination with a reservoir for one of the ingredients to be catalyzed and means for feeding the same into the vessel.

2. An apparatus for use in catalyzing a reaction between an organic compound and any of the halogens, the said apparatus comprising an enlarged quartz vessel having a mercury vapor tube formed integral therewith and having walls of quartz and suitable electrodes, a vent tube and a condenser in combination with a reservoir for one of the ingredients to be catalyzed and means for feeding the same into the vessel, the vessel having an inlet at the bottom for other ingredients.

3. An apparatus for use in catalyzing a reaction between an organic compound and any of the halogens, the said apparatus comprising an enlarged quartz vessel having a mercury vapor tube formed integral therewith and having walls of quartz and suitable electrodes, a vent tube and a condenser in combination with a reservoir for one of the ingredients to be catalyzed and means for feeding the same into the vessel, the vessel having an inlet and an outlet at the bottom for other ingredients, and a paddle having a stem provided with a pulley whereby the said paddle can be operated for stirring the ingredients.

4. An apparatus for catalyzing organic compounds, comprising a flask of quartz, a mercury vapor electric apparatus, the container having an active portion of quartz formed integral with and inside of the flask, in combination with means for filling and withdrawing reacting materials from said flask and electrical means for exciting said vapor apparatus.

5. An apparatus for catalyzing organic compounds, comprising a flask of quartz, a mercury vapor electric apparatus, the container having an active portion of quartz formed integral with and inside of the flask, in combination with means for filling and withdrawing reacting materials from said flask, electrical means for exciting said vapor apparatus and means for stirring the materials within said flask from a source of mechanical power outside thereof.

6. An apparatus for catalyzing organic compounds comprising a flask of quartz, a mercury vapor electric apparatus, the container having an active portion of quartz formed integral with and inside of the flask, in combination with means for filling and withdrawing reacting materials from said flask, electrical means for exciting said electrical apparatus, and a condensing vent for relieving the pressure and preventing the the escape of vapors from said flask.

7. A catalyzing apparatus for organic compounds, comprising an elongated source of catalyzing radiations, means for continuously supplying a mixture of reagent materials to said apparatus having walls transparent to the radiation located in the sides toward the source and the neighborhood of said catalyzing source, means for passing said materials around and along said source and for withdrawing said materials upon the completion of the contemplated reactions.

8. The combination with an exhausted quartz tube with an anode and a mercury cathode therein, an exhausted jacket surrounding said tube and a reaction chamber with quartz walls between said chamber and said tube, surrounding said tube, and an inlet and an outlet for said reaction chamber and a condensing vent therefor.

Signed at New York in the county of New York and State of New York this 23" day of July, A. D. 1913.

FREDERICK G. KEYES.

Witnesses:
HAROLD B. WOODWARD,
GEORGE H. STOCKBRIDGE.